(12) United States Patent
Ouplomb

(10) Patent No.: US 9,205,926 B2
(45) Date of Patent: Dec. 8, 2015

(54) METHOD AND SYSTEM FOR FEEDING AND VENTILATING WITH AIR A PLANT OF AN AIRCRAFT AUXILIARY POWER UNIT

(75) Inventor: Patrick Ouplomb, Bondigoux (FR)

(73) Assignee: MICROTURBO, Toulouse (FR)

( * ) Notice: Subject to any disclaimer, the term of this patent is extended or adjusted under 35 U.S.C. 154(b) by 819 days.

(21) Appl. No.: 13/326,938

(22) Filed: Dec. 15, 2011

(65) Prior Publication Data

US 2012/0151933 A1 Jun. 21, 2012

(30) Foreign Application Priority Data

Dec. 16, 2010 (FR) ...................................... 10 60603

(51) Int. Cl.
| | | |
|---|---|---|
| *F02C 6/00* | (2006.01) | |
| *B64D 41/00* | (2006.01) | |
| *F02C 7/32* | (2006.01) | |
| *B64D 33/02* | (2006.01) | |

(52) U.S. Cl.
CPC . *B64D 41/00* (2013.01); *F02C 7/32* (2013.01); *B64D 2033/0213* (2013.01); *B64D 2041/002* (2013.01)

(58) Field of Classification Search
CPC .. F02C 7/32; H02K 7/1823; B64D 2041/002; F05B 2220/50
USPC ............. 60/39.83, 801, 802, 778, 784, 39.15; 244/58, 54
See application file for complete search history.

(56) References Cited

U.S. PATENT DOCUMENTS

| | | | |
|---|---|---|---|
| 5,012,639 A * | 5/1991 | Ream et al. | .................. 60/226.1 |
| 5,655,359 A | 8/1997 | Campbell et al. | |
| 2003/0080244 A1 | 5/2003 | Dionne | |
| 2004/0060278 A1 | 4/2004 | Dionne | |
| 2005/0268593 A1 | 12/2005 | Hagshenas | |
| 2006/0059891 A1 | 3/2006 | Sheoran et al. | |
| 2007/0193277 A1 * | 8/2007 | Sheoran et al. | .................. 60/802 |
| 2008/0245062 A1 | 10/2008 | Dionne | |

FOREIGN PATENT DOCUMENTS

| | | |
|---|---|---|
| EP | 0 743 247 A2 | 11/1996 |
| WO | WO 03/037715 A1 | 5/2003 |

OTHER PUBLICATIONS

French Preliminary Search Report and Written Opinion issued Aug. 17, 2011, in French 1060603, filed Dec. 16, 2010 (with English Translation of Categories of Cited Documents).

* cited by examiner

*Primary Examiner* — Gerald L Sung
(74) *Attorney, Agent, or Firm* — Oblon, McClelland, Maier & Neustadt, L.L.P.

(57) ABSTRACT

A system and a method for ventilating a plant including an auxiliary power unit (APU) in an aircraft compartment are disclosed. The compartment is ventilated in an independent manner with individualized air feeds to each item of equipment concerned. According to one embodiment, a system for feeding and ventilating an aircraft auxiliary power source plant includes an APU and items of equipment mounted in connection with the APU. The APU is fitted with an exhaust nozzle which leads into a gas discharger mounted outside the compartment. Separate and independent ducts channel air between air inlets made through the compartment, and the APU and items of equipment. At least one ventilation duct that is separate and independent from the other ducts is coupled to an air inlet of the compartment in order to ventilate the APU and the items of equipment of the plant.

6 Claims, 1 Drawing Sheet

METHOD AND SYSTEM FOR FEEDING AND VENTILATING WITH AIR A PLANT OF AN AIRCRAFT AUXILIARY POWER UNIT

TECHNICAL FIELD

The invention relates to a method for feeding and ventilating with air an aircraft auxiliary power source plant centred on an auxiliary power unit (abbreviated as APU) or equivalent for supplying power on an aircraft. The invention also relates to an APU air feed and ventilation system capable of using such a method.

An APU can supply power to the items of equipment (alternators, pumps, pressure compressors, air conditioning) of the aircraft, directly and/or indirectly via a power transfer box, abbreviated as BTP, with multiple outlets, notably during the transitional flight phases (take-off, acceleration, stationary flight for helicopters, etc.). During the stable phases, for example cruising, the main engines can generate the electricity necessary for the items of equipment via the APU running as a generator or via a standalone generator.

The APUs are dedicated particularly to starting the main engines of the aircraft. For this purpose, the APUs supply energy to the gas generators of the engines until the running cycle of these gas generators is operational. They also supply non-propulsive energy (pneumatic, electrical and/or hydraulic) to the ground during the starting or standby phase. Certain secure APU units can also intervene in flight in the event of a failure of an engine in order to try to restart it or to supply energy to the items of equipment.

Like any turbine engine, an APU conventionally comprises a compressor/combustion chamber/turbine assembly forming a gas generator. Cool air is introduced into the compressor, then the compressed air, mixed with the fuel, causes the combustion in the dedicated chamber. The hot gases expand in the turbine which partially transmits the mechanical power produced to the compressor via a transmission shaft, the residual power being directed via a BTP to the items of equipment. In another type of architecture, the kinetic power of the exhaust gases may also drive a free turbine which, in its turn, transmits the power, via a shaft, to the items of equipment (alternators, pumps, pressure compressor, etc.). The residual gases are discharged via an exhaust nozzle.

PRIOR ART

Installing an APU in a compartment that is dedicated thereto, usually in the tail unit in an aeroplane or in the top portion of the cell of a helicopter, requires an arrangement of the air feed of the gas generator but also ventilation in this compartment. Specifically, the ventilation of the items of equipment connected to the gas generator and the feeding with air of the exchangers (air/oil or more usually air/fluid) must be provided in the compartment.

In particular, the new generations of APU of the "all electric" type require proportionally higher cooling air flow rates in the presence of additional alternators to be cooled, for example instead of a pressure compressor, and greater powers to be dissipated originating from the BTP and from the items of equipment.

The flows of air and of other fluids may interact in the compartment and their interactions must be thermally controlled in the complete operating range of the APU which can then cover considerable and sudden temperature variations. These flows may be generated mechanically—electroventilator, fan driven by the BTP—or by a vacuum caused by a jet pump effect induced by a discharger on the gas exhaust nozzle.

Known from patent document U.S. Pat. No. 7,364,117 is a passive cooling system for an APU arranged in a nacelle by an oil cooler. This cooler is placed in an air-flow duct which travels, by piping the outlet of the cooler, to the outlet discharger of the nacelle. The mounting of the cooler on pipework incorporating the discharger requires complex and bulky sheet metalwork which adversely affects the effectiveness of the ventilation and induces an increase in weight and cost.

Moreover, patent documents EP 0 968 918 and EP 0 626 039 provide that the air flow that traverses the oil cooler originates from an air inlet close to the discharger. The cooler is also mounted on pipework connected to the discharger. This solution causes the same drawbacks.

SUMMARY OF THE INVENTION

The object of the invention is precisely to prevent these drawbacks while achieving optimized ventilation of the compartment. To do this, the invention proposes to ventilate the compartment in an independent manner and to individualize the air feed of each item of equipment.

More precisely, the object of the invention is a method for feeding and ventilating with air an aircraft auxiliary power source plant comprising an auxiliary power unit APU and items of equipment connected to the APU, this plant being arranged in an aircraft compartment. In this method, the air feed is supplied to the APU and to each item of equipment that may require an air feed through an independent and separate passageway. The external ventilation of the APU and of the items of equipment of the plant is carried out through at least one ventilation air passageway that is independent and separate from the other air passageways.

In these conditions, the various feeding and ventilating air flows are captured separately at air inlets of the aircraft: the problems of distributing flow rates from a common inlet are thus avoided. Moreover, the use of internal mobile systems (valves, flaps, gates, etc.) can be dispensed with: reliability is increased and costs reduced accordingly.

According to preferred embodiments:
the external ventilation of the APU and of the items of equipment of the plant is carried out through the ventilation air passageway after a cooling air/fluid exchange;
the air/fluid exchange is arranged at the air inlet of the compartment of the aircraft.
a discharge of the air from the compartment to the outside of the aircraft is caused by a jet pump effect, and
the air/fluid exchange at the inlet of the compartment, dedicated to the ventilation and discharge of the air are arranged in the compartment relative to the APU and to the items of equipment so that the ventilation of the APU and of the items of equipment is maximized.

The invention also relates to a system for feeding and ventilating with air an aircraft auxiliary power source plant comprising an auxiliary power unit APU and items of equipment mounted in connection with the APU, this plant being arranged in an aircraft compartment. The APU is fitted with an exhaust nozzle which leads into a gas discharger mounted outside the compartment, from an opening of this compartment. In this system, separate and independent ducts channel the air between air inlets, made through the compartment, and respective inlets of the gas generator and items of equipment which may require an air feed. At least one ventilation duct that is separate and independent from the other ducts is coupled to an air inlet of the compartment in order to ventilate the APU and the items of equipment of the plant.

According to particular embodiments:

at least one ventilation duct connects an air inlet of the compartment to an air/fluid exchanger;

the air/fluid exchanger is arranged as close as possible to the skin of the aircraft so that the duct for connection to the exchanger is of minimal length;

the gas discharger has a mouth resting on the opening of the compartment formed to cause an air vacuum in the compartment capable of creating air flows and evacuating them into the discharger by a jet pump effect;

the air/fluid exchanger traversed by the air dedicated to the ventilation, the items of equipment, the APU and the discharge opening are positioned respectively from upstream to downstream and the items of equipment distributed in the compartment so that the air flows generate a maximized ventilation of the items of equipment and of the APU.

BRIEF DESCRIPTION OF THE FIGURES

Other aspects, features and advantages of the invention will appear in the non-limiting description of the following embodiment, with reference to the appended drawings which represent respectively.

DETAILED DESCRIPTION

In this description, the "upstream-downstream" qualifier follows the direction defined by the gas flows in the gas generator, the "downstream-upstream" qualifier follows the reverse direction.

Figure 1:
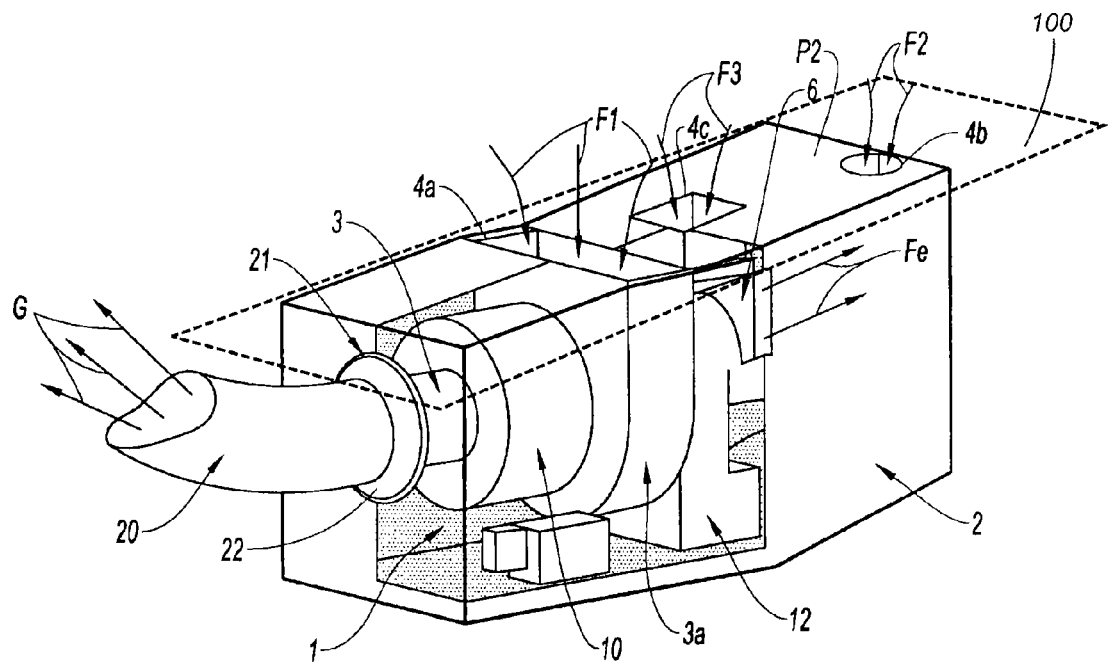
In FIG. 1, a view in downstream-upstream perspective of a plant according to the invention in a partially cut-away aircraft compartment with, in the foreground, the gas discharger, and In FIG. 2, a view in upstream-downstream perspective of the plant according to FIG. 1 in this compartment.

With reference to FIG. 1, the view in downstream-upstream perspective illustrates a plant 1 according to the invention in a closed compartment 2, partially cut away and arranged under the aircraft skin 100. This plant comprises an auxiliary power unit APU 10 and items of equipment mounted in connection with the APU. The compartment 2 is fitted with an exhaust nozzle 3 which leads into a gas discharger 20. This discharger 20 is mounted outside the compartment on an opening 21 formed in the compartment 2. In this figure, the gas discharger 20 appears in the foreground, coupled to the APU, itself coupled to an accessories box 12 capable of driving in particular an alternator 13 (see FIG. 2). The box 12 is a main transfer box incorporating pinions and reduction gears (not shown) with multiple adaptation outputs between a power shaft (not shown) of the APU 10 and of the items of equipment such as the alternator 13.

Figure 2:
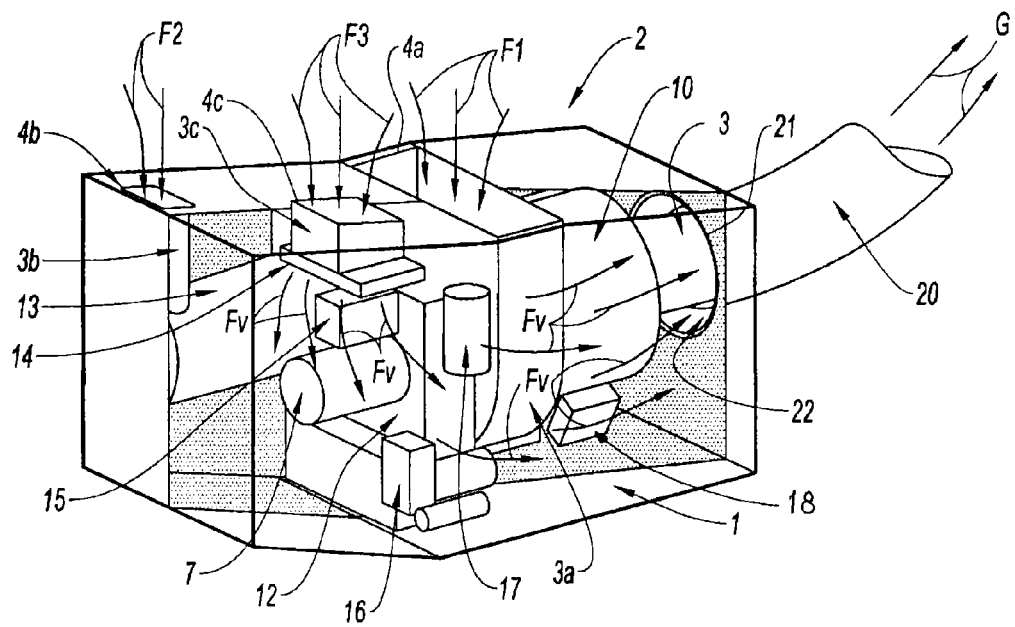

As appears also in the upstream-downstream view of FIG. 2, separate and independent ducts 3a to 3c directly channel the air (arrows F1 to F3) between the air inlets 4a to 4c made through the skin 100 of the aircraft and on a wall P2 of the compartment 2, and respectively the APU 10, the alternator 13 and an air/oil exchanger 14. The accessories box 12 is also the support of other items of equipment namely, in the example illustrated, the fuel heater 15, the fuel pump 16, the fuel filter 17, a starter motor 7 dedicated to the electric starting of the APU, and the fuel distribution unit 18. In this example, an automatic ventilation by an incorporated fan (not shown) generates the air feed of the alternator 13.

The ducts 3a to 3c are box assemblies which aspirate the air directly. These box assemblies may be components of the items of equipment or, as illustrated, extensions formed by ducts up to the inlets 4a to 4c. The same applies for the exhaust outlet 6 for the air flow Fe of the alternator 13.

In operation, the combustion gases G of the APU 10 which escape through the discharger 20 via the nozzle 3 generate a vacuum in the compartment 2. The vacuum is caused by the jet pump effect induced by the appropriate shape of the mouth 22 of the discharger 20 resting on the opening 21. This vacuum in its turn causes an aspiration of air originating from the air inlet 4c via the exchanger 14. Leaving the exchanger, the air then ventilates the compartment 2 and all of the items of equipment via the air flows Fv.

In certain cases, the air flow rate through the exchanger 14 may be too much for the requirements of the exchanger. Advantageously, the exchanger incorporates a thermostatic valve gate which makes it possible to divert the oil flow below a determined temperature threshold.

Advantageously, the exchanger 14 is arranged upstream in the compartment so that the vacuum, which draws the air towards the discharger 20 downstream, causes the air flows Fv to flow onto the items of equipment and the gas generator in an evenly distributed manner. Moreover, the items of equipment are distributed in the compartment so that the ventilation of the items of equipment and of the APU is maximized.

The exchanger 14 is arranged as close as possible to its air inlet 4c so that the duct 3c for connection to the exchanger is of minimal length in order to optimize heat exchange, pressure losses, weight and bulk.

By virtue of the air feed passageways formed by the ducts 3a to 3c, the air flows F1 to F3 dedicated to the specific feeds are independent and totally separate from the ventilation flows Fv for the items of equipment of the compartment.

The invention is not limited to the embodiment described and shown. It is for example possible to provide several ventilation ducts arranged upstream, in the compartment of the APU. Moreover, the air inlets may be distributed over several walls of the compartment and not on a single wall as shown in the appended figures.

The invention claimed is:

1. A method for feeding and ventilating with air an aircraft auxiliary power source plant comprising an auxiliary power unit (APU), items of equipment connected to the APU, and at least one item of equipment that requires an air feed, the aircraft auxiliary power source plant being arranged in an aircraft compartment and the APU being fitted with an exhaust nozzle which leads into a gas discharger mounted outside the compartment from an opening of the compartment, the method comprising:

supplying air feed to the APU and to each of the at least one item of equipment that requires an air feed through an independent and separate air feed passageway, wherein external ventilation of the APU and of the items of equipment of the aircraft auxiliary power source plant is carried out through at least one ventilation air passageway that is independent and separate from the air feed passageways and from other ventilation air passageways, wherein the external ventilation of the APU and of the items of equipment of the aircraft auxiliary power source plant is carried out through the ventilation air passageway after a cooling air/fluid exchange, and wherein the air/fluid exchange is arranged at an air inlet of the compartment of the aircraft.

2. The feeding and ventilation method according to claim 1, wherein a discharge of the air from the compartment to the outside of the aircraft is caused by a jet pump effect.

3. The feeding and ventilation method according to claim 1, wherein the air/fluid exchange at the inlet of the compartment, dedicated to the ventilation and discharge of the air is arranged respectively upstream and downstream in the compartment relative to the APU.

4. A system for feeding and ventilating with air an aircraft auxiliary power source plant comprising:
an auxiliary power unit (APU);
items of equipment mounted in connection with the APU and at least one item of equipment that requires an air feed, the aircraft auxiliary power source plant being arranged in an aircraft compartment and the APU being fitted with an exhaust nozzle which leads into a gas discharger mounted outside the compartment from an opening of the compartment,
wherein separate and independent air feed ducts channel the air between air inlets, made through the compartment, and the APU and each of the at least one item of equipment which requires an air feed,
wherein at least one ventilation duct that is separate and independent from the air feed ducts and from other ventilation ducts is coupled to an air inlet of the compartment, and
wherein at least one ventilation duct connects an air inlet of the compartment to an air/fluid exchanger in order to ventilate the APU and the items of equipment of the aircraft auxiliary power source plant after a cooling air/fluid exchange in the air/fluid exchanger.

5. The system for feeding and ventilating with air according to claim 4, wherein a gas discharger has a mouth resting on the opening of the compartment formed to cause an air vacuum in the compartment capable of creating air flows and evacuating the air flows into the gas discharger by a jet pump effect.

6. The system for feeding and ventilating with air according to claim 4, wherein the air/fluid exchanger traversed by the air dedicated to the ventilation, the items of equipment, the APU and a discharge opening are positioned respectively from upstream to downstream, and the items of equipment are distributed in the compartment.

\* \* \* \* \*